United States Patent
Droz

(10) Patent No.: US 10,558,905 B2
(45) Date of Patent: Feb. 11, 2020

(54) METHOD FOR PRODUCING A DEVICE COMPRISING AT LEAST ONE ELECTRONIC ELEMENT ASSOCIATED WITH A SUBSTRATE AND AN ANTENNA

(71) Applicant: NID SA, La Chaux-de-Fonds (CH)

(72) Inventor: François Droz, Corcelles (CH)

(73) Assignee: NID SA, La Chaux-de-Fonds (CH)

( * ) Notice: Subject to any disclaimer, the term of this patent is extended or adjusted under 35 U.S.C. 154(b) by 0 days.

(21) Appl. No.: 15/549,190

(22) PCT Filed: Feb. 20, 2015

(86) PCT No.: PCT/EP2015/053661
§ 371 (c)(1),
(2) Date: Aug. 7, 2017

(87) PCT Pub. No.: WO2016/131499
PCT Pub. Date: Aug. 25, 2016

(65) Prior Publication Data
US 2018/0018548 A1 Jan. 18, 2018

(51) Int. Cl.
*G06K 19/077* (2006.01)

(52) U.S. Cl.
CPC . *G06K 19/07722* (2013.01); *G06K 19/07745* (2013.01); *G06K 19/07749* (2013.01); *G06K 19/07773* (2013.01)

(58) Field of Classification Search
CPC ....... G06K 19/07749; G06K 19/07745; G06K 19/07722; G06K 19/0775; G06K 19/07779; G06K 19/07783; G06K 19/077
See application file for complete search history.

(56) References Cited

U.S. PATENT DOCUMENTS 4,545,838 A * 10/1985 Minkus ................... B32B 27/08
156/220
5,962,840 A * 10/1999 Haghiri-Tehrani .........................
G06K 19/07749
235/449

(Continued)

FOREIGN PATENT DOCUMENTS

EP 0694871 A1 * 1/1996 ............. B29C 65/02
WO WO-02095816 A1 * 11/2002 ............. H01L 24/81

(Continued)

OTHER PUBLICATIONS

International Search Report and Written Opinion issued in application No. PCT/EP2015-053661 dated Nov. 11, 2015, 10 pages (with translation of International Search Report, 2 pages).

*Primary Examiner* — Christopher Stanford
(74) *Attorney, Agent, or Firm* — Pearne & Gordon LLP

(57) ABSTRACT

The invention relates to a method for producing a device comprising at least one electronic element (3) associated with a substrate (1) and an antenna (4). According to the invention, this method comprises the following steps:
  the antenna (2) is disposed on the upper face (6) of the substrate (1);
  the electronic element (3, 10) is introduced at least partially into the substrate (1);
  the assembly is laminated in a way allowing the antenna (2) and the electronic element (3, 10) to enter into the substrate (1) completely; and
  the laminated substrate (1) is cooled under a press.
The invention also relates to a device obtained in this way, either as a finished product or a semi-finished product. This device can find application as a chip card or in a passport.

9 Claims, 2 Drawing Sheets

(56) References Cited

U.S. PATENT DOCUMENTS

| | | | | |
|---|---|---|---|---|
| 6,301,119 B1* | 10/2001 | Thevenot | ......... | G06K 19/07749 174/260 |
| 6,374,486 B1* | 4/2002 | Brechignac | ...... | G06K 19/07745 235/488 |
| 6,435,415 B1* | 8/2002 | Catte | ................ | G06K 19/07749 235/488 |
| 6,522,549 B2* | 2/2003 | Kano | ............... | G06K 19/07722 156/292 |
| 6,908,786 B2* | 6/2005 | Halope | ........... | G06K 19/07749 438/106 |
| 7,688,209 B2* | 3/2010 | Halope | ................. | G06K 19/02 235/385 |
| 8,172,978 B2* | 5/2012 | Halope | ........... | G06K 19/07749 156/291 |
| 2002/0060903 A1* | 5/2002 | Kano | ............... | G06K 19/07722 361/727 |
| 2003/0153120 A1* | 8/2003 | Halope | ........... | G06K 19/07749 438/106 |
| 2005/0006482 A1* | 1/2005 | Kano | ................. | B29C 65/7808 235/488 |
| 2005/0230486 A1* | 10/2005 | Halope | ........... | G06K 19/07749 235/492 |
| 2006/0172458 A1* | 8/2006 | Droz | ............... | G06K 19/07745 438/107 |
| 2007/0001859 A1* | 1/2007 | Kayanakis | .............. | B32B 37/02 340/572.7 |
| 2007/0095922 A1* | 5/2007 | Kawai | .................... | G06K 19/02 235/492 |
| 2007/0141760 A1* | 6/2007 | Ferguson | ............ | B29C 35/0888 438/127 |
| 2007/0171129 A1* | 7/2007 | Coleman | .......... | G06K 19/07718 343/700 MS |
| 2007/0176273 A1* | 8/2007 | Wolny | ............. | G06K 19/07749 257/679 |
| 2009/0000107 A1* | 1/2009 | Koch | ............... | G06K 19/07749 29/601 |
| 2009/0038735 A1* | 2/2009 | Kian | ................ | G06K 19/07718 156/73.1 |
| 2009/0095415 A1* | 4/2009 | Halope | ............ | G06K 19/07749 156/277 |
| 2010/0147958 A1* | 6/2010 | Martinent | ............ | G06K 19/027 235/492 |
| 2012/0175422 A1* | 7/2012 | Zambon | ........... | G06K 19/07722 235/488 |

FOREIGN PATENT DOCUMENTS

WO          2004102469 A1    11/2004
WO    WO-2007065404 A2 *   6/2007   ....... G06K 19/07749

* cited by examiner

METHOD FOR PRODUCING A DEVICE COMPRISING AT LEAST ONE ELECTRONIC ELEMENT ASSOCIATED WITH A SUBSTRATE AND AN ANTENNA

TECHNICAL FIELD OF THE INVENTION

This invention concerns a method for producing a device comprising at least one electronic element associated with a substrate or an antenna, such a device being able to find application as a chip card or in a passport.

This invention relates moreover to the device obtained, which is either a finished product or a semi-finished product.

BACKGROUND OF THE INVENTION

Known from the international application No. WO2004102469 is a method for mounting of an electronic component on a substrate.

SUMMARY OF INVENTION

The main object of the present invention is to propose a method which allows a device to be achieved of the same type as certain assemblies obtained by the method proposed in the aforementioned international application, but which has in particular a lesser thickness, an improved quality, in particular an increased robustness, as well as lower manufacturing costs.

This object is attained by means of a method for producing a device comprising at least one electronic element associated with a substrate and an antenna, this method being noteworthy in that it comprises the following steps:
  an antenna is disposed on the upper face of a substrate;
  an electronic element is introduced at least partially into the substrate;
  the assembly is laminated in a way allowing the antenna and the electronic element to enter into the substrate completely; and
  the laminated substrate is cooled under a press.

Thus, whereas in the prior art methods, the laminations served to put together at least two layers of material, according to the present invention the lamination serves to introduce entirely into the substrate the antenna and the still emerging part of the electronic element, which has the advantage of allowing a product to be obtained constituted by a single layer in which the electronic element and the antenna are submerged. In fact, contrary to the case of the standard lamination, known to this day, wherein the device obtained comprises an electronic element placed between two layers of laminated material, the device according to the present invention comprises only one single layer having the electronic element comprised entirely within.

It follows that the device obtained is less thick than those obtained by implementing the methods of the prior art.

Moreover it uses fewer layers of material and thus less material which makes it easy to produce and more economical.

Furthermore a better conductivity has been noted with regard to the antenna—due to the temperature and the compression of the particles of the ink as well as the connection between the antenna and the chip during the lamination—which leads to better performance.

BRIEF DESCRIPTION OF THE DRAWINGS

Other features and advantages of the invention will now be described in detail in the following description which is given with reference to the attached figures, which represent diagrammatically.

DETAILED DESCRIPTION OF THE INVENTION

First Embodiment

Figure 1:
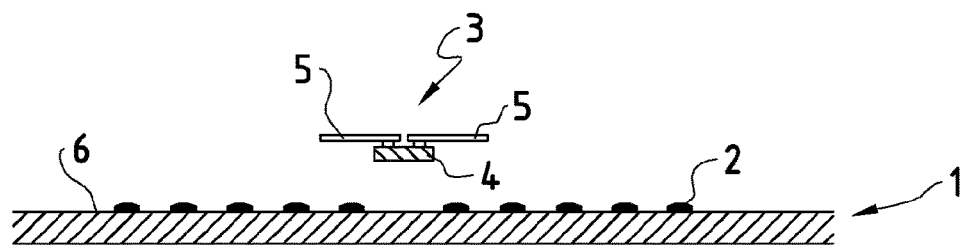
FIG. 1: an electronic element positioned for the purpose of its mounting in a substrate coated with an antenna.
Figure 2:
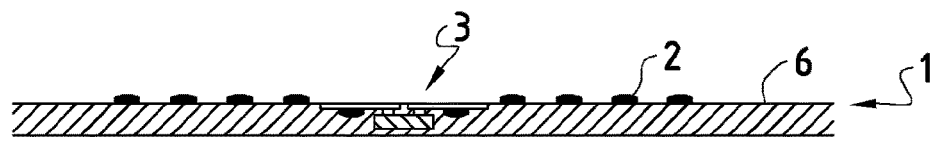
FIG. 2: the electronic element-substrate-antenna assembly after mounting.
Figure 3:
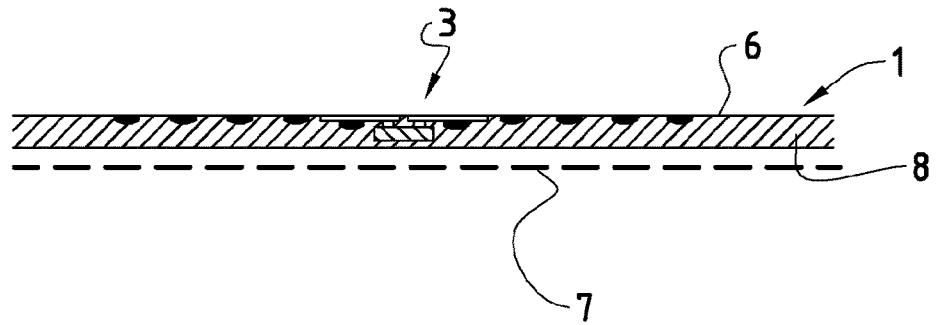
FIG. 3: the assembly of FIG. 2 after lamination and before the optional application of a sealing sheet.
Figure 4:
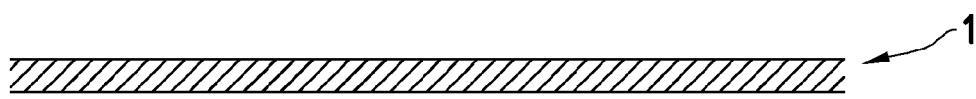
FIG. 4: a substrate similar to the substrate of FIG. 1.
Figure 5:
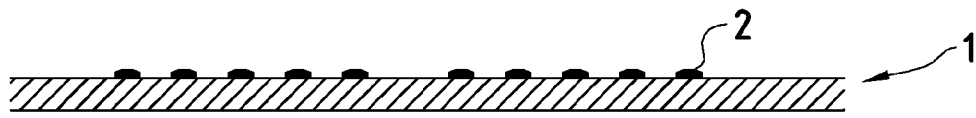
FIG. 5: the substrate of FIG. 4 after deposit of an antenna.
Figure 6:
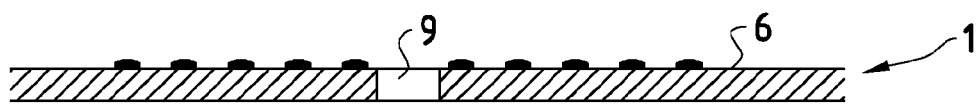
FIG. 6: the substrate of FIG. 5 after making of a hole.

A first embodiment of the invention is represented in FIGS. 1 to 3.

In FIG. 1 an electronic element 3 can be seen, composed of an electronic chip 4 with its connectors 5 situated above it and a support or substrate 1 having an upper face 6 on which an antenna 2 has been disposed in known fashion (for example by printing). The antenna 2 thus protrudes with respect to the upper face 6 of the substrate 1.

This substrate has in an overall way the shape of a generally rectangular sheet. Its thickness can range, for example, between 100 and 250 microns.

The thickness of the electronic chip 4 is generally from 75 to 150 microns and that of its connectors 5 from 8 to 50 microns. Such a chip 4-connectors 5 (the electronic element) assembly is generally called "strap".

The antenna 2 also generally has a thickness on the order of 8 to 50 microns.

To pass from FIG. 1 to FIG. 2, that is to say to make the relief created by the antenna 2, the chip 4, the connectors 5 and the insulating bridge (not represented in the figures) disappear, which helps to allow one end of the antenna 2 to meet the other end of the antenna 2 above the coils of the antenna 2 with a view to connection of this antenna and of the connectors 5 of the chip 4 without creating a short circuit, the strap 3 is disposed in the substrate 1, the assembly is laminated in a heat press which softens the substrate 1 and which allows all the elements (the antenna 2, the strap 3 and the insulating bridge) to penetrate into the substrate 1. Then, the whole thing is solidified in a cold press.

The lamination method thus comprises, first of all, a step of pressing at a high temperature, then a step of pressing at a lower temperature.

Preferably a sufficiently great pressure is used (or rather pressures, knowing that a hot pressing is generally followed by a cold pressing) in order to make the electronic element 3 penetrate completely into the substrate 1. In other words, the chip 4 as well as its connectors 5 are totally incorporated in the substrate 1.

Since the connectors 5 are in contact with a small portion of the antenna 2, this portion is then likewise pushed into the interior of the substrate 1.

To prevent, during the lamination, certain elements (for example the antenna 2) from remaining stuck on the devices which apply the pressure on the upper face 6 of the substrate 1, a metal sheet is generally used, made of anti-adherent material. Alternatively, it is also possible to use a "standard" metal sheet, but to dispose an anti-adherent sheet on this metal sheet in order to prevent the adhesion of the laminated elements on the metal sheet.

This anti-adherent sheet, if it is used, is a sheet not adhering to the upper face 6 of the substrate 1, neither at the time of its simple deposit on this face 6, nor owing to the pressure exerted during the lamination. It consists, for example, of a teflon sheet.

Thus, after the lamination and the removal of this anti-adherence sheet (if it is used), the device which can be seen in FIG. 3 is obtained. As can be noted, the electronic element 3 with its chip 4 and the connectors 5 and the antenna 2 are completely incorporated into the substrate 1.

Second Embodiment

According to a second embodiment, an electronic element 10, generally called an "electronic module" is used which is composed of an electronic chip connected on a lead frame, the chip being covered by a sheathing of mechanical protection.

Figure 7:
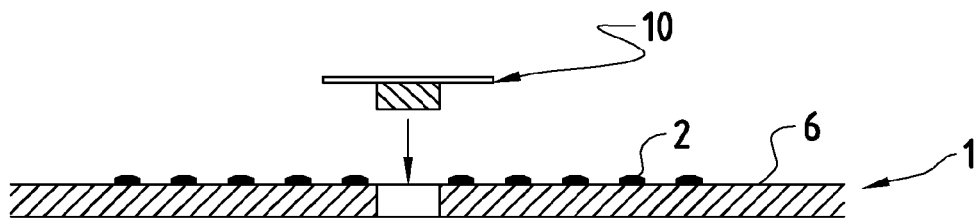
FIG. 7: the introduction of an electronic element into the substrate of FIG. 6.
Figure 8:
FIG. 8: the substrate of FIG. 7 after lamination.

One then proceeds as represented in FIGS. 4 to 8:
one starts with a substrate 1, which can be composed in particular of plastic or of a suitably rigid cardboard (FIG. 4);
as in the first embodiment, an antenna 2 (FIG. 5) is disposed on the upper face 6 of the substrate 1, for example by printing;
a hole 9, generally a through hole (FIG. 6), is made on the upper face 6 of the substrate 1 (FIG. 6), in order to be able to accommodate there a portion of the electronic module 10;
the electronic module 10 is introduced completely into the through hole 9 (FIG. 7), a small portion of the antenna 2 in contact with the lateral regions of the lead frame thus being likewise sunken into the substrate 1; the lead frame protruding at least partially with respect to the upper face 6 of the substrate 1; and
one proceeds to laminate, as explained in the context of the first embodiment, to push or finish pushing the lead frame and the rest of the antenna 2 into the substrate 1 (FIG. 8).

A substrate 1 is thus obtained with a perfectly smooth upper face 6, completely containing the antenna 2 and the electronic module 10.

It is important to note that, during the step of lamination, the particles of the ink of the antenna 2 are compressed, which leads to better performance as regards the conductivity.

As with the method according to the first embodiment of the present invention, a metal sheet made of an anti-adherent material can again be used during the lamination. Alternatively, it is also possible to use a "standard" metal sheet, but to dispose an anti-adherent sheet on this metal sheet in order to prevent the adhesion of the laminated elements on the metal sheet.

The dimensions of the through hole 9 can be planned in such a way that the hole only accommodates the chip of the electronic module 10 with its sheathing.

It is likewise possible to provide for a supplementary step in order to allow the electronic module 10 to be fixed on the substrate 1, in particular when the substrates 1 with the antennas 2 and the electronic modules 10 are moved toward the lamination machine (thus between FIG. 7 and FIG. 8). In this case, a layer of glue can be applied, for example, between the substrate 1 and the electronic module 10. Alternatively, the electronic module 10 can be introduced using force into the through hole 9 so that it remains there in a fixed way.

The device obtained as indicated in the aforementioned embodiments is a semi-finished product.

In an alternative variant of the method, the through hole 9 is not made in the substrate 1 before the lamination. In fact, in certain cases, it would likewise be possible to proceed to lamination of the substrate 1 just with the antenna 2 and to use metal sheets with suitable reliefs in order to create cavities (blind holes) at foreseen places for the insertion of the electronic element 10.

In this case, the substrates 1 with the antenna 2 introduced in the substrate 1 and the accommodation cavities foreseen for the electronic elements 10 in the substrate 1 can be used as semi-finished products. Then, the electronic elements 10 can be inserted in the cavities and can be laminated again, or fixed in the cavities with the aid of a glue or something similar.

In any case, the thickness of the substrate 1 is preferably slightly greater than that of the electronic element 3 or 10 so that during the step of lamination this electronic element 3 or 10 can be pushed entirely into the substrate.

The semi-finished product is thus without relief both on the upper face 6 and on the lower face 8, this making it possible to achieve thinner and more flexible products, which considerably increases their quality, in particular because such products are more resistant to bending and to deformation. The incorporation of the electronic element 3 or 10 as well as of the antenna 2 into the mass of the substrate allows a thinner, more robust and less costly semi-finished product to be obtained.

Figure 10:
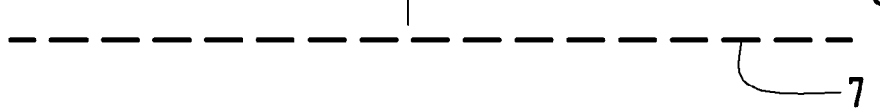
FIG. 10: the putting in place of a sealing layer on the lower face of the substrate.

In certain cases, the semi-finished product can be transformed into a finished product by providing for a supplementary step of application of a sealing coating or layer (or of a film) 7 (cf. FIGS. 3 and 10) on the upper face 6 and/or on the lower face 8 of the substrate 1 in order to protect the latter against any penetration of moisture which would risk changing the sought features of the final product.

A chip card, such as an RFID card, can thus be achieved, which can be a card for transport, for payment, for access to a place, for access to a service, or in a non-limiting way an electronic passport, etc., the chip/antenna assembly forming a transponder.

Figure 9:
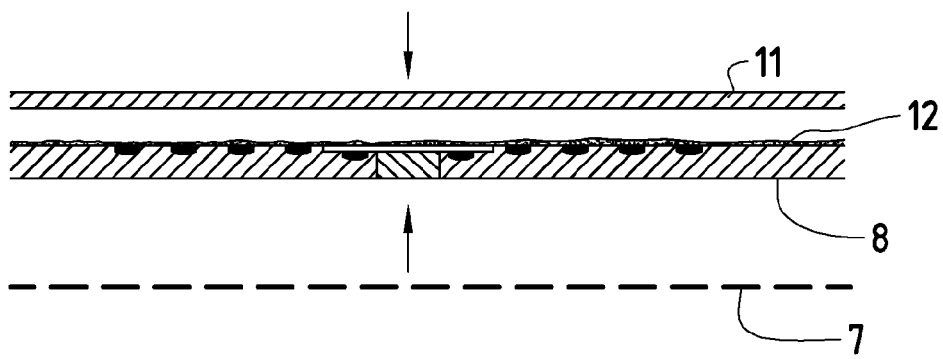
FIG. 9: the application of a sheet on the upper face of the substrate.

Another supplementary step, visible in FIG. 9, can also be provided for, which consists in depositing a layer of glue 12 on all or part of the upper face 6 of the substrate 1 before applying a cover 11 there (for example for the creation of an electronic document). The nature of this cover 11 depends on the use foreseen for the finished product, this being able to be a document of identity, such as a passport, an identity card or a residence permit, for example.

By adding to the device of FIG. 3 or 8 a sheet of paper on the upper face and another on the lower face of the substrate, an "electronic ticket", is obtained, for example, or another document of value.

It goes without saying that the device can include a plurality of electrical elements each having an antenna or a common antenna.

The position of the element or elements can of course be adapted according to the product to be created in order to comply with the mechanical constraints of the product.

Although various embodiments have been described, it is well understood that it is not conceivable to describe all the possible embodiments in an exhaustive way. It is certainly feasible to replace one described means with an equivalent means without departing from the scope of the present invention. All these modifications form part of the common knowledge of one skilled in the art in the technological field of the production of the described semi-finished products and final products.

The invention claimed is:

1. A method for producing a device comprising at least one electronic element associated with a substrate and an antenna, wherein the electronic element comprises connectors positioned above and extending horizontally from an electronic chip, the method comprising the following steps: first, the connectors are connected to the electronic chip and the antenna is disposed on an upper face of the substrate; then the electronic element is introduced only partially into the substrate, via softening the substrate and allowing the electronic element to penetrate the substrate, to form an assembly prior to the connectors contacting the antenna; then the assembly is laminated in a way allowing the antenna and the electronic element to enter into the substrate completely; and then the laminated substrate is cooled under a press.

2. The method according to claim 1, wherein the antenna is printed using an ink on the upper face of the substrate.

3. The method according to claim 2, wherein, during the lamination step, particles of the ink of the antenna are compressed, which results in better performance with respect to conductivity.

4. The method according to claim 1, wherein the electronic element is a strap.

5. The method according to claim 1, wherein the electronic element is an electronic module.

6. The method according to claim 1, wherein, before the lamination, an anti-adherence sheet is applied on the upper face of the substrate and, after the cooling, the anti-adherence sheet is removed.

7. The method according to claim 6, wherein the anti-adherence sheet is a polymer sheet or a teflonized sheet.

8. The method according to claim 1, comprising a supplementary step of application of a sealing layer on a lower face and/or on the upper face of the substrate.

9. The method according to claim 1, comprising a supplementary step of application of a cover on the upper face of the substrate.

* * * * *